US012770637B2

(12) United States Patent
Kim et al.

(10) Patent No.: US 12,770,637 B2
(45) Date of Patent: Oct. 20, 2026

(54) DEVICE AND METHOD FOR AUTOMATICALLY REMOVING A BACKGROUND SOUND SOURCE OF A VIDEO

(71) Applicant: SK Telecom Co., Ltd., Seoul (KR)

(72) Inventors: Dong Won Kim, Seoul (KR); Suk Bong Kwon, Seoul (KR); Yong Hyun Park, Seoul (KR); Jong Kil Yun, Seoul (KR); Jeong Yeon Lim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 163 days.

(21) Appl. No.: 18/641,485

(22) Filed: Apr. 22, 2024

(65) Prior Publication Data

US 2024/0265932 A1 Aug. 8, 2024

Related U.S. Application Data

(63) Continuation-in-part of application No. PCT/KR2022/015718, filed on Oct. 17, 2022.

(30) Foreign Application Priority Data

Oct. 26, 2021 (KR) ........................ 10-2021-0144070
Jan. 10, 2022 (KR) ........................ 10-2022-0003531

(51) Int. Cl.
*G10L 21/0272* (2013.01)
*G10L 13/027* (2013.01)

(52) U.S. Cl.
CPC ........ *G10L 21/0272* (2013.01); *G10L 13/027* (2013.01)

(58) Field of Classification Search
CPC .......................... G10L 21/0272; G10L 13/027
See application file for complete search history.

(56) References Cited

U.S. PATENT DOCUMENTS 10,839,822 B2 * 11/2020 Chen ...................... G06N 3/044
12,367,887 B2 * 7/2025 Master .................... G10L 19/02
(Continued)

FOREIGN PATENT DOCUMENTS

EP 1909263 A1 4/2008
KR 10-2015-0092671 A 8/2015
KR 10-2021-0112714 A 9/2021

OTHER PUBLICATIONS

Simpson et al., Deep karaoke: Extracting vocals from musical mixtures using a convolutional deep neural network, International Conference on Latent Variable Analysis and Signal Separation. Cham: Springer International Publishing, 2015 (Year: 2015).*
(Continued)

*Primary Examiner* — Bhavesh M Mehta
*Assistant Examiner* — Eunice Lee
(74) *Attorney, Agent, or Firm* — Hauptman Ham, LLP

(57) ABSTRACT

One aspect of the present disclosure provides a method for automatically removing a background sound source of audio data of a video, including separating the audio data including at least one sound source component into a first component related to a human voice and a second component related to sounds other than the human voice using a first separation model, separating the first component into a vocal component and a speech component using a second separation model, separating the second component into a music component and a noise component using a third separation model, and generating an audio data with the background sound source for the audio data of the video removed by synthesizing the speech component and the noise component.

11 Claims, 11 Drawing Sheets

(56) References Cited

U.S. PATENT DOCUMENTS

| | | | | |
|---|---|---|---|---|
| 12,412,590 | B1 * | 9/2025 | Dantrey | G06N 3/044 |
| 2010/0204990 | A1 | 8/2010 | Hirose et al. | |
| 2018/0122403 | A1 * | 5/2018 | Koretzky | G10L 21/028 |
| 2020/0035256 | A1 | 1/2020 | Choi | |
| 2021/0256995 | A1 | 8/2021 | Jansson et al. | |
| 2023/0186937 | A1 * | 6/2023 | Uhlich | G10L 15/22 704/251 |

OTHER PUBLICATIONS

International Search Report of PCT /KR2022/015718 mailed on Feb. 15, 2023.

Joseph, Richard et al. Convolutional Neural Networks Based Algorithm for Speech Separation. In: Proceedings of the 3rd International Conference on Advances in Science & Technology (ICAST). Apr. 8, 2020, pp. 1-5.

Office Action dated May 21, 2026, for the corresponding Korean Patent Application No. 10-2022-0003531, along with an English machine translation (Total 12 pages).

Martin Strauss et al., "A hands-on comparison of DNNs for dialog separation using transfer learning from music source separation.", arXiv preprint arXiv:2106.09093, Jun. 22, 2021 (Total 5 pages).

* cited by examiner

DEVICE AND METHOD FOR AUTOMATICALLY REMOVING A BACKGROUND SOUND SOURCE OF A VIDEO

CROSS-REFERENCE TO RELATED APPLICATIONS

This is a bypass continuation-in-part application of International PCT application No. PCT/KR2022/015718, filed on Oct. 17, 2022, which claims priority to Republic of Korea Patent Application No. 10-2021-0144070, filed on Oct. 26, 2021, and Republic of Korea Patent Application No. 10-2022-0003531, filed on Jan. 10, 2022, which are incorporated by reference herein in their entirety.

TECHNICAL FIELD

The present disclosure relates to a device and method for automatically removing a background sound source of a video.

BACKGROUND

The statements described below simply provide background information related to embodiments of the present disclosure and does not constitute the related art.

Video production is subjected to a mastering process of capturing an original video using a camera and then adding a title, a logo, a caption, a background sound source (BGM), a sound effect, etc. After the mastering, the original video, the title, the logo, the caption, the background sound, and the sound effect are not stored separately, and only the audio data of the mastered video is stored.

When exporting such video overseas, cases occur where video business operators may have to pay royalties due to licensing of the background sound source used in the video depending on export areas, or may not export the video due to copyright issues. To solve this problem, only the background sound source used in the video must be separated from the audio data of the video and deleted or replaced with another background sound source. To this end, a method for separating only a specific background sound source from mastered audio data is required.

In particular, when the background sound source includes not only instrument sound but also human singing voices, a method for accurately separating a voice corresponding to a background sound source from a human voice not included in the background sound source, for example, a voice such as a conversation voice in a video is required.

SUMMARY

According to one embodiment of the present disclosure, the present disclosure accurately separates only a specific background sound source from an audio data of a mastered video.

The problems to be solved by the present disclosure are not limited to the above-described problems, and other problems that are not mentioned may be obviously understood by those skilled in the art from the following description.

At least one aspect of the present disclosure provides a method for automatically removing a background sound source of audio data of a video, including separating the audio data including at least one sound source component into a first component related to a human voice and a second component related to sounds other than the human voice using a first separation model, separating the first component into a vocal component and a speech component using a second separation model, separating the second component into a music component and a noise component using a third separation model, and generating an audio data with the background sound source for the audio data of the video removed by synthesizing the speech component and the noise component.

Another aspect of the present disclosure provides a device for automatically removing a background sound source of a video, including a memory configured to store one or more instructions, and a processor configured to execute the one or more instructions stored in the memory, wherein the processor executes the one or more instructions to separate the audio data including at least one sound source component into a first component related to a human voice and a second component related to sounds other than the human voice using a first separation model, separate the first component into a vocal component and a speech component using a second separation model, separate the second component into a music component and a noise component using a third separation model, and generate an audio data with the background sound source for the audio data of the video removed by synthesizing the speech component and the noise component According to an embodiment of the present disclosure, it is possible to generate audio data of a video with a background sound source accurately removed by accurately separating a specific background sound source from audio data of a mastered video.

DETAILED DESCRIPTION

Figure 1:
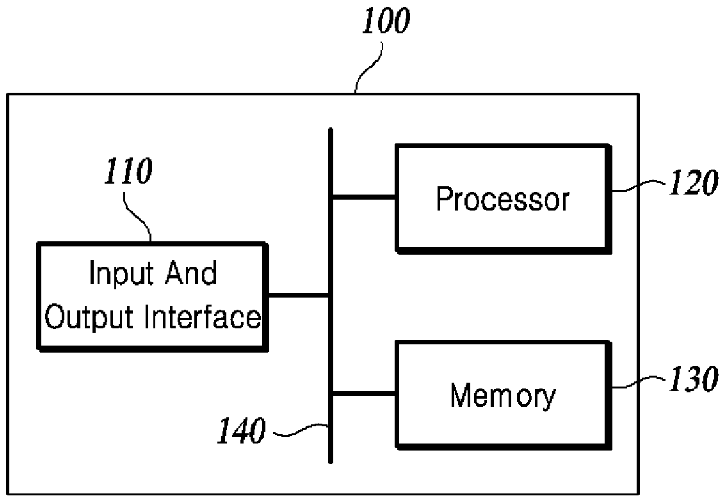
FIG. 1 is a block configuration diagram of a device for automatically removing a background sound source of a video according to an embodiment of the present disclosure.

Hereinafter, some exemplary embodiments of the present invention will be described in detail with reference to the accompanying drawings. In the following description, like reference numerals preferably designate like elements, although the elements are shown in different drawings. Further, in the following description of some embodiments of the present invention, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The following detailed description, together with the accompanying drawings, is intended to describe exemplary embodiments of the present disclosure and is not intended to represent the only embodiments in which the present disclosure may be practiced.

Hereinafter, a music component is a component corresponding to a background sound source of audio data of a video, and refers to a component such as instrument sound. A vocal component refers to a component such as a singing voice among components corresponding to the background sound source. A speech component refers to a component related to a human voice among the remaining data excluding the background sound source in the audio data of the video, and a noise component refers to the remaining components excluding the speech component, the vocal component, and the music component among the audio data of the video.

Hereinafter, when describing the present disclosure with reference to the attached drawings, duplicate descriptions of the same components will be omitted.

FIG. 1 is a block configuration diagram of a device for automatically removing a background sound source of a video according to an embodiment of the present disclosure.

Referring to FIG. 1, a device 100 for automatically removing a background sound source of a video includes an input output interface 110, a processor 120, and a memory 130. Here, the input and output interface 110, the processor 120, and the memory 130 included in the device 100 for automatically removing a background sound source of a video can transmit data to each other through a bus 140. The bus 140 may include a wireless or wired communication infrastructure that enables interaction between various components of the device 100 for automatically removing a background sound source of a video.

When the audio data of the video is input to the device 100 for automatically removing a background sound source of a video, the input and output interface 110 inputs the data to the processor 120.

The input and output interface 110 may transmit the audio data separated by the processor 120 to at least one of the memory 130 and an external output device connected to the device 100 for automatically removing a background sound source of a video.

The processor 120 may include or be part of any device capable of processing a sequence of instructions as a component for removing the background sound source from the video. For example, the processor 120 may include a computer processor, a processor within a mobile device or other electronic devices, or a digital processor.

The processor 120 may include one or more separation models for separating the audio data of the input video into a plurality of preset components. Here, the separation model may be a deep neural network trained using a deep learning algorithm. The separation model may be a deep learning neural network including at least one of a convolution neural network (CNN) and a recurrent neural network (RNN).

The processor 120 may include one or more calculation module that convert or inversely convert input data to input the audio data of the input video into the separation model. Here, the calculation module may convert or inversely convert the audio data into a frequency domain, or calculate a magnitude or phase of the audio data.

The memory may include a volatile memory, a permanent memory, a virtual memory, or other memories for storing information used by or output from the device 100 for automatically removing a background sound source of a video. For example, the memory 130 may include a random access memory (RAM) or a dynamic RAM (DRAM). The memory 130 may store a program for processing or controlling the processor 120 and various data for an operation of the device 100 for automatically removing a background sound source of a video.

Figure 2:
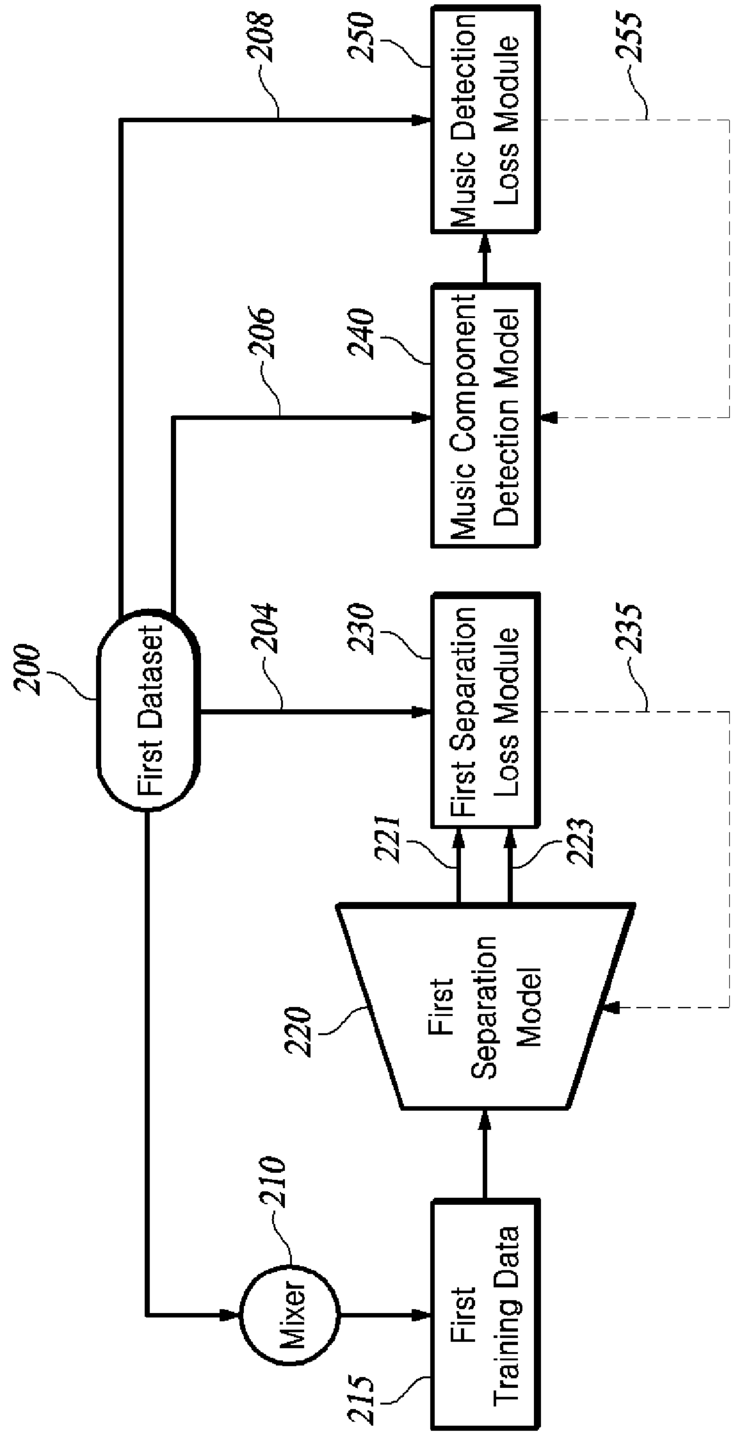
FIG. 2 is a diagram for describing a process of training a first separation model and a music component detection model according to an embodiment of the present disclosure.

FIG. 2 is a diagram for describing a process of training a first separation model and a music component detection model according to an embodiment of the present disclosure.

Referring to FIG. 2, a first dataset 200 including ground truths to a plurality of preset sound source components is prepared. Here, the plurality of preset sound source components may include at least one of the speech component, the vocal component, the music component, and the noise component.

A mixer 210 generates first training data 215 which is audio data combined based on at least two or more of a ground truth to the speech component, a ground truth to the vocal component, a ground truth to the music component, and a ground truth to the noise component, which are included in the first dataset 200. The generated first training data 215 is input to a first separation model 220.

The first separation model 220 separates the first training data 215 into a first component 221 related to a human voice and a second component 223 related to sounds other than the human voice and outputs the separated components.

The first separation loss module 230 calculates a first separation loss by using a preset loss function based on the separated first component 221, the separated second component 223, and the ground truth 204 corresponding to each separated component. Here, the preset loss function calculates the first separation loss based on an error between the first component 221 and the ground truth to the first component and an error between the second component and the ground truth to the second component. The ground truth to the first component and the ground truth corresponding to the second component may be provided from the dataset 200.

The first separation model 220 is trained through a process of updating at least one weight of the first separation model 220 in a direction of decreasing the first separation loss using a backpropagation algorithm 235.

The music component detection model 240 is trained to detect the music component using training data 206 on the music component included in the first dataset 200. The training of the music component detection model 240 may proceed simultaneously with the training process of the first separation model 220, but is not limited thereto.

The music component detection model 240 is trained to detect whether the input training data 206 is the music component. For example, the music component detection model 240 may output a value related to the probability that the input training data is the music component. The music detection loss module 250 calculates a music detection loss using a preset loss function based on a value related to the probability of being the music component output by the music component detection model 240 and a ground truth 208 corresponding to the input training data 206. Here, the preset loss function calculates the music detection loss based on the error between the probability value output by the music component detection model 240 and the ground truth 208 corresponding thereto.

The music component detection model 240 is trained through a process of updating at least one weight of the music component detection model 240 in the direction of decreasing the music detection loss using the backpropagation algorithm 255.

Figure 3:
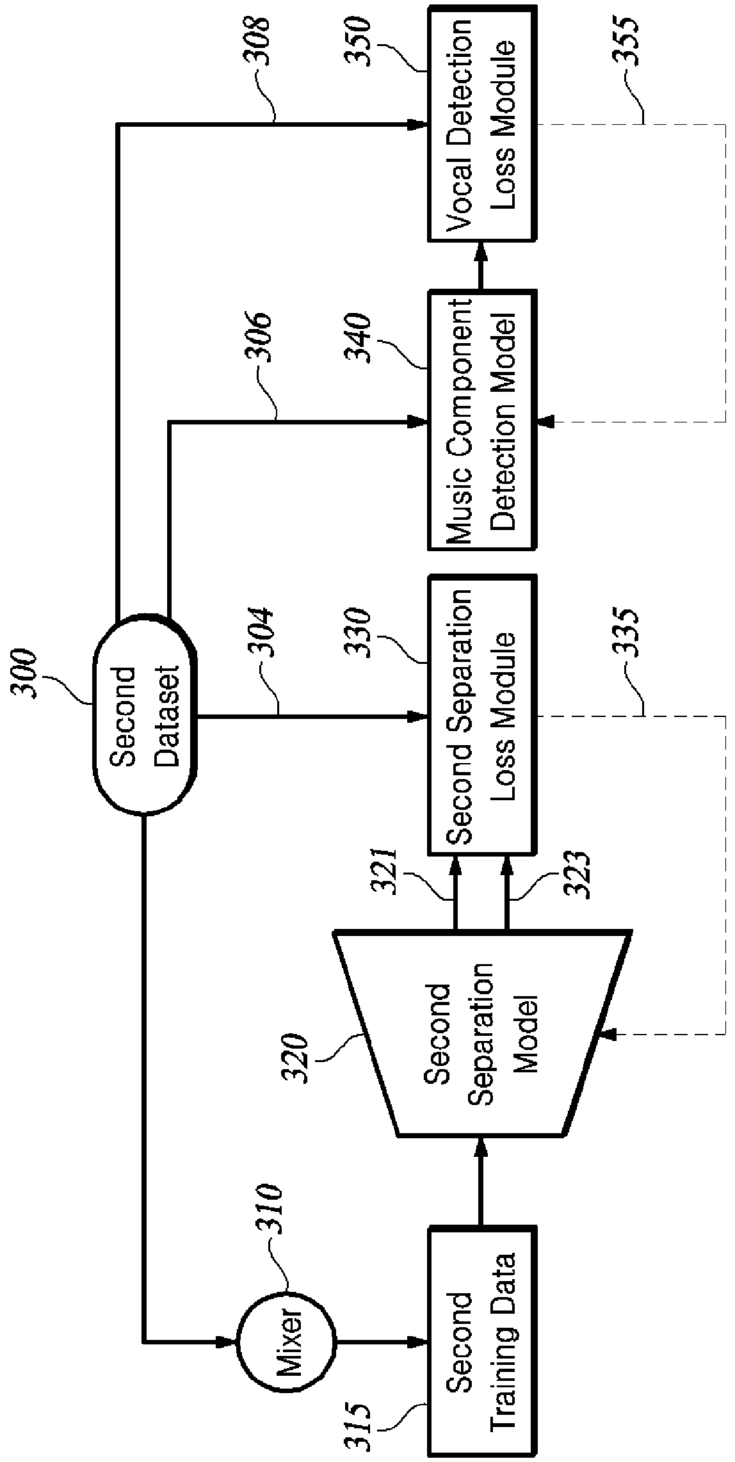
FIG. 3 is a diagram for describing a process of training a second separation model and a vocal component detection model according to an embodiment of the present disclosure.

FIG. 3 is a diagram for describing a process of training a second separation model and a vocal component detection model according to an embodiment of the present disclosure.

Referring to FIG. 3, a second dataset 300 including the ground truths to the speech component and the vocal component is prepared. The mixer 310 generates second training data 315 combined based on the correct answer to the speech component and the ground truth to the vocal component, which are included in the second dataset 300. The generated second training data 315 is input to a second separation model 320.

The second separation model 320 separates the second training data 315 into a speech component 321 and a vocal component 323 and outputs the separated components.

A second separation loss module 330 calculates a second separation loss by using a preset loss function based on the separated first component 321, the separated second component 323, and the ground truth 304 corresponding to each separated component. Here, the preset loss function calculates the second separation loss based on the error between the speech component 321 and the ground truth corresponding to the speech component and the error between the vocal component 323 and the ground truth corresponding to the vocal component.

The second separation model 320 is trained through a process of updating at least one weight of the second separation model 320 in a direction of decreasing the second separation loss using a backpropagation algorithm 335.

The vocal component detection model 340 is trained to detect the vocal component using training data 306 on the vocal component included in the second dataset 300. The training of the vocal component detection model 340 may proceed simultaneously with the training process of the second separation model 320, but is not limited thereto.

The vocal component detection model 340 is trained to detect whether the input training data 306 is a vocal component and output a value related to the probability that the input training data 306 is a vocal component. The vocal detection loss module 350 is calculated using a preset loss function based on the value related to the probability that the training data 306 is a vocal component and a ground truth 308 to the input training data 306. Here, the preset loss function calculates the vocal detection loss based on the error between the value related to the probability output by the vocal component detection model 340 and the ground truth 308.

The vocal component detection model 340 is trained through a process of updating at least one weight of the vocal component detection model 340 in the direction of decreasing the vocal detection loss using the backpropagation algorithm 355.

Figure 4:
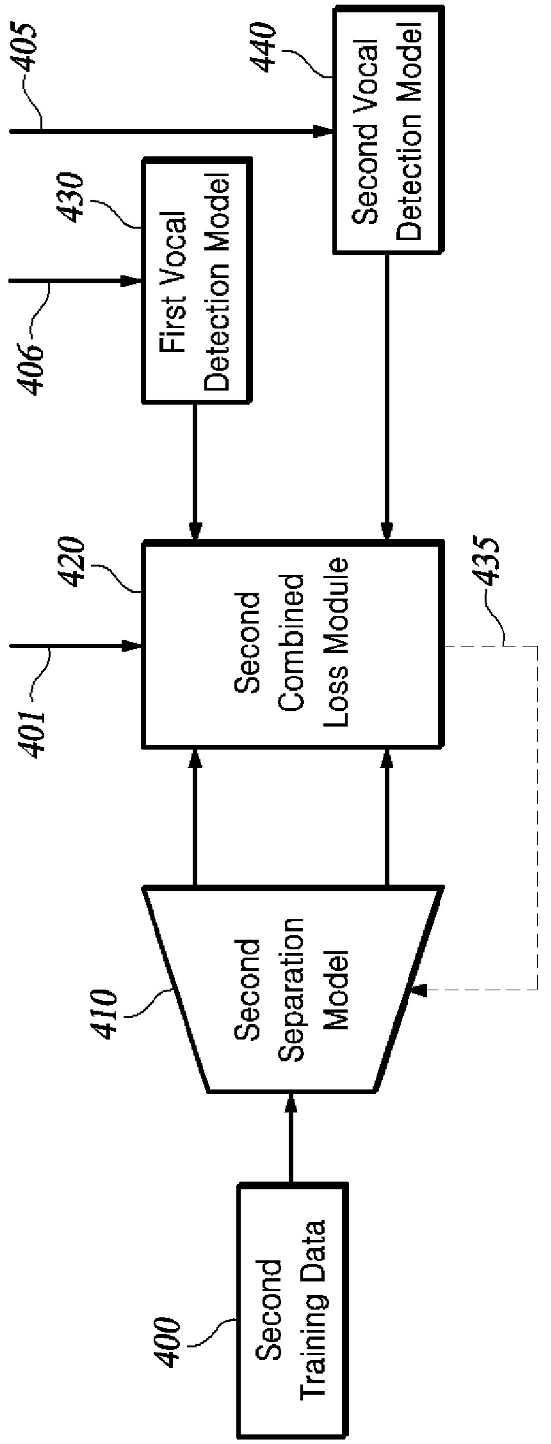
FIG. 4 is a diagram for describing a process of training a second separation model using a pre-trained vocal component detection model according to an embodiment of the present disclosure.

FIG. 4 is a diagram for describing a process of training a second separation model using a pre-trained vocal component detection model according to an embodiment of the present disclosure.

In order to accurately train the separation model, the data included in the dataset used in the training process should be cleaned so that it is clearly separated according to each component. However, the process of cleaning data and generating a dataset takes a lot of manpower and time. In addition, in the data of the generated dataset, there may be a case in which one separated component is mixed with other components, for example, dirty data having a ground truth to the vocal component being mixed with some speech components. When the training data generated based on these components is used, it is difficult to accurately train the separation model.

Therefore, by performing a sanity check on the training data using the pre-trained vocal component detection model to measure the quality of the training data and reflecting data on the quality of the measured training data in the process of updating the weight of the separation model, it is possible to accurately train the second separation model using the dirty data. For example, when the measured quality of the training data is low, the degree of reflection of the training results is set low during the weight update process, and when the measured quality is high, the degree of reflection of the training results is set high during the weight update process to reduce the side effects of the dirty data on the training process.

Referring to FIG. 4, second training data 400 generated based on the ground truth to the speech component and the ground truth to the vocal component are input to a second separation model 410. Here, at least one of the ground truth to the speech component and the ground truth to the vocal component may be the dirty data.

The second separation model 410 separates the second training data 400 into the speech component and the vocal component, and inputs the separated speech component and vocal component to a second combined loss module 420.

At least one ground truth constituting the second training data 400 is input to pre-trained vocal detection models 430 and 440. The vocal detection models 430 and 440 measure the quality of the ground truth to the input second training data 400 and input second quality data to the second combined loss module 420. Here, the second quality data, which are calculated by the vocal detection models 430 and 440, may be a value related to the probability that the ground truths corresponding to the speech component and the vocal component included in the second training data are the vocal component.

A ground truth 406 to the speech component of the second training data 400 is input to the pre-trained first vocal detection model 430, and a ground truth 405 to the vocal component of the second training data 400 is input to the pre-trained second vocal detection model 440. The first vocal detection model 430 and the second vocal detection model 440 calculate and output the value related to the probability that each input is a vocal component. The value related to the probability that the ground truth 406 to the speech component of the second training data 400 is a vocal component and the value related to the probability that the ground truth 405 to the vocal component of the second training data 400 is a vocal component are input to the second combined loss module 420.

The second combined loss module 420 calculates, based on the speech component and the vocal component separated by the second separation model 410 and the ground truth 401 corresponding to each separated component, the second separation loss for each component. The second combined loss module 420 uses the first vocal detection model 403 and the second vocal detection model 440 to calculate the second detection loss for the speech component and the vocal component separated by the second separation model 410.

The second combined loss module 420 calculates the second combined loss using a preset combined loss function based on the second separation loss, the second detection loss, the quality data of the ground truth 406 to the speech component of the second training data 400, and the quality data of the ground truth 405 to the vocal component of the second training data 400. The second combined loss module 420 calculates the second combined loss using a preset combined loss function based on the second separation loss, the second detection loss, the quality data of the ground truth 406 to the speech component of the second training data 400, and the quality data of the ground truth 405 to the vocal component of the second training data 400. The second separation model 410 is trained through a process of updating at least one weight of the second separation model 410 in the direction of decreasing the second combined loss using a backpropagation algorithm 435.

By reflecting the data on how accurately the ground truth included in the second training data 400 is separated in the second combined loss using the above-described training process, at least one weight of the second separation model is updated differently depending on the quality of the ground truth. Therefore, it is possible to accurately train the second separation model without reducing the training efficiency due to the dirty data.

Figure 5:
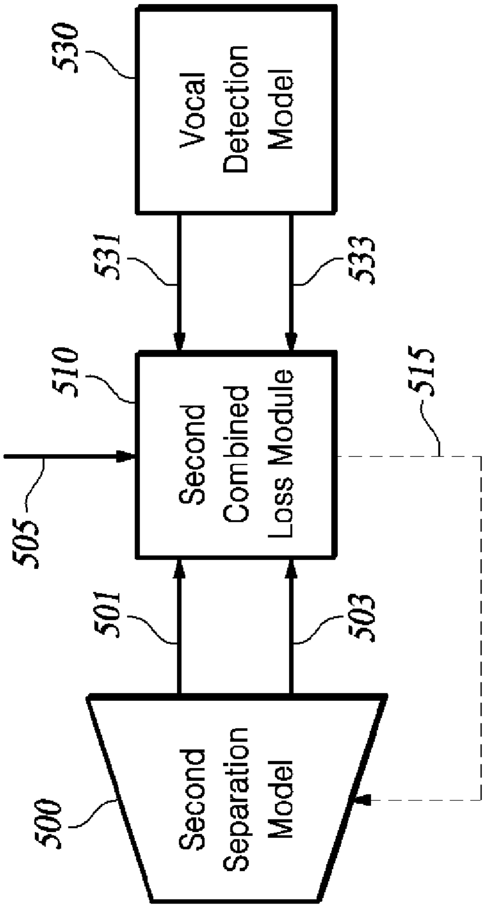
FIG. 5 is a diagram for describing a process of calculating a combined loss in the process of training a second separation model according to an embodiment of the present disclosure.

FIG. 5 is a diagram for describing a process of calculating a combined loss in the process of training a second separation model according to an embodiment of the present disclosure.

Referring to FIG. 5, the second training data including at least one ground truth corresponding to the dirty data is input to the second separation model 500. The second separation model 500 separates the input training data into a speech component 501 and a vocal component 503, and inputs the separated speech component 501 and vocal component 503 to a second combined loss module 510.

The vocal detection model 530 calculates a value related to the probability that each of the ground truth to the speech component and the ground truth to the vocal component included in the second training data is a vocal component. A probability 531 that the ground truth to the speech component is a vocal component and a probability 533 that the ground truth to the vocal component is a vocal component are input to the second combined loss module 510.

The second combined loss module 510 calculates the second combined loss using a preset combined loss function. The second combined loss includes the second separation loss and the second detection loss. Here, the second separation loss and the second detection loss have different weights in the second combined loss.

The second separation loss is calculated based on a difference between the speech component 501 and the vocal component 503 output by the second separation model 500 and a ground truth 505 corresponding to each component. The calculation of the second separation loss may use methods such as a mean absolute error (MAE) and a mean square error (MSE), but is not limited thereto. For example, the second training data, which is the voice data, may be converted into a frequency domain using short-time Fourier transform (STFT), and calculate the second separation loss using the mean absolute error (MAE) or mean square error (MSE) from the ground truth.

The second detection loss is calculated based on the probability that the speech component 501 and the vocal component 503 are the vocal component. When the speech component 501 is accurately separated, the probability that the speech component 501 is a vocal component should be 0%. The second detection loss for the speech component 501 is calculated based on the difference between the probability that the separated speech component 501 is a vocal component and the probability of 0%. On the other hand, when the vocal component 503 is accurately separated, the probability that the vocal component 503 is a vocal component should be 100%. The second detection loss for the vocal component 503 is calculated based on the difference between the probability that the separated vocal component 503 is a vocal component and the probability of 100%.

The quality of the input data is calculated based on the probability that the ground truth corresponding to the speech component 501 and vocal component 503 is a vocal component. When the ground truth corresponding to the speech component 501 is the dirty data partially including the vocal component, the probability greater than 0% is calculated depending on the degree to which the vocal component is included. Therefore, the higher the quality of the ground truth corresponding to the speech component 501, the lower the probability that the speech component 501 is a vocal component. Conversely, in the case of the ground truth corresponding to the vocal component 503, when it is the dirty data, the probability smaller than 100% is calculated. As the quality of the ground truth corresponding to the vocal component 503 increases, the probability that the vocal component 503 is a vocal component approaches 100%.

The combined loss in the process of training the separation model using the pre-trained detection model may be calculated using a loss function such as Equation 1.

$$L = p \times (w \times DL(x) + SL(x)) \quad \text{Equation 1}$$

L is the combined loss, and x is the data separated by the separation model. p is the probability obtained by inputting the ground truth corresponding to the separated data into the pre-trained detection model. Here, p represents the quality of the input data. For example, it may be determined that the higher the probability obtained by inputting vocal component data to the vocal detection model, the more accurate data it is, and the smaller the probability, the dirty data it is. Therefore, the higher the probability, the relatively greater the weight is reflected in the loss calculation process.

w is the weight for the detection loss. DL(x) is the detection loss calculated based on the probability obtained by inputting the separated data x to the pre-trained detection model, and SL(x) is the separation loss for the separated data x.

The second combined loss in the process of training the second separation model using the pre-trained vocal detection model may be calculated using the loss function as shown in Equation 2.

$$L = sp \times L_s + vp \times L_v \quad \text{Equation 2}$$

L is the second combined loss of the second separation model. $L_s$ is the loss for the speech component, $L_v$ is the loss for the vocal component, sp is the probability, obtained using the vocal detection model, that the ground truth for the speech component is not the vocal component, and vp is the probability, obtained using the vocal detection model, that the ground truth to the vocal component is not the vocal component.

The second combined loss is the sum of the value obtained by multiplying the probability that the ground truth to the speech component is not the vocal component by the loss for the speech component and the value obtained by multiplying the probability that the ground truth to the vocal component is a vocal component by the loss for the vocal component. Here, the loss for the speech component may be calculated based on Equation 3.

$$L_s = w \times VDL_{min}(s) + SL(s) \quad \text{Equation 3}$$

s is the separated speech component. $VDL_{min}(s)$ is the detection loss related to the probability, obtained by inputting the separated speech component s to the vocal detection model, that the separated speech component s is not a vocal, and w is the weight for the detection loss. SL(s) is the separation loss for the speech component s.

The loss for the vocal component may be calculated based on Equation 4.

$$L_v = w \times VDL_{max}(v) + SL(v) \quad \text{Equation 4}$$

v is the separated vocal component. $VDL_{max}(v)$ is the detection loss related to the probability, obtained by inputting the separated vocal component v to the vocal detection model, that the separated vocal component v is a vocal component, and w is the weight for the detection loss. SL(v) is the separation loss for the vocal component v.

Figure 6:
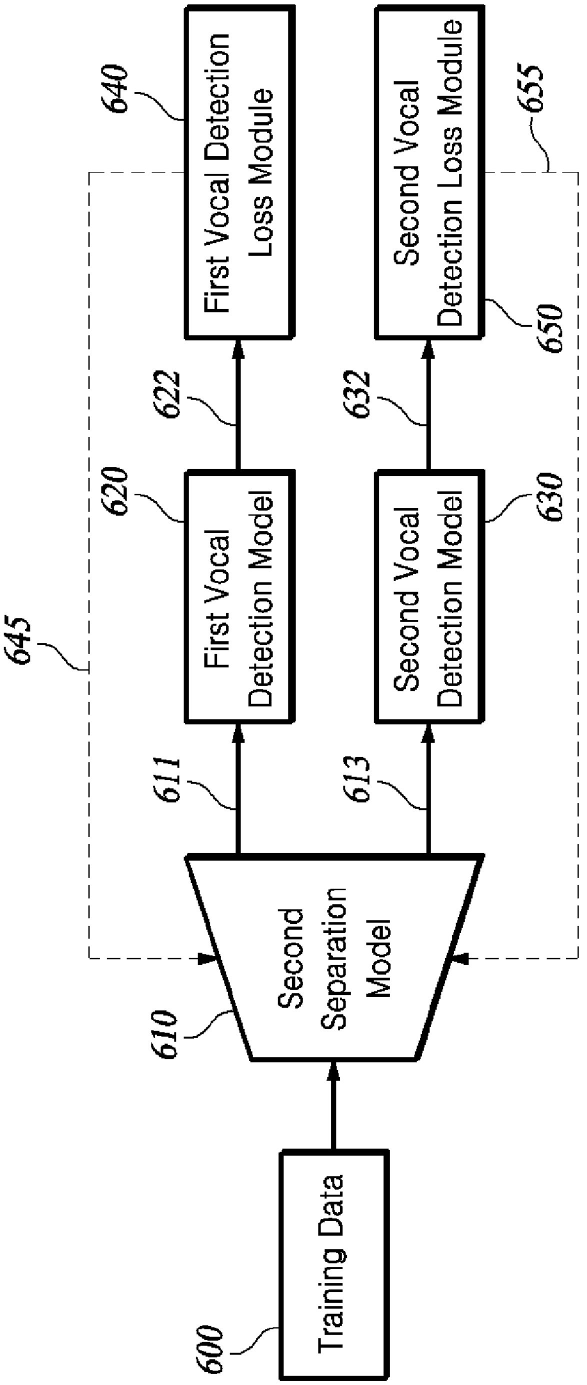
FIG. 6 is a diagram for describing a process of unsupervised learning on a second separation model using a trained vocal detection model according to an embodiment of the present disclosure.

FIG. 6 is a diagram for describing a process of unsupervised learning on a second separation model using a trained vocal detection model according to an embodiment of the present disclosure.

Referring to FIG. 6, training data 600 whose component is not separated is input to a second separation model 610. Here, the training data 600 may be voice data including at least one of the speech component, the vocal component, the music component, and the noise component. The training data 600 may be single mixture data that has not been separated for sound source components in advance. The second separation model 610 separates a speech component 611 and a vocal component 613 from the training data 600 and outputs the separated speech component 611 and vocal component 613.

The separated speech component 611 is input to a first vocal detection model 620, and the separated vocal component 613 is input to a second vocal detection model 630. Here, the first vocal detection model 620 and the second vocal detection model 630 are the pre-trained vocal detection models.

The first vocal detection model 620 outputs a probability 622 that the input speech component 611 is a vocal component. As the speech component 611 is accurately separated, the probability 622 of not being a vocal component has a value approaching 0%. The probability 622 of not being a vocal component is input to a first vocal detection loss module.

The first vocal detection model 630 outputs a probability 632 that the input vocal component 613 is a vocal component. As the vocal component 613 is accurately separated, the probability 632 of being a vocal component has a value approaching 100%. The probability 632 of being a vocal component is input to a second vocal detection loss module. A first vocal detection loss module 640 and a second vocal detection loss module 650 calculate a loss related to the probability input to each module.

The second separation model 610 is trained by updating at least one weight of the second separation model in the direction of minimizing the loss calculated by the first vocal detection loss module 640 and the second vocal detection loss module 650 using backpropagation algorithms 645 and 655. Here, since the first vocal detection model 620 and the second vocal detection model 630 are pre-trained, the weight is fixed and only the weight of the second separation model is updated.

The third separation model is trained to separate the input data into the music component and noise component using the same training process as that of the second separation model described above using FIGS. 3 to 6. Just as the second separation model is learned using the pre-trained vocal detection model, the third separation model may be trained using the pre-trained music detection model. In addition, detailed descriptions of components that overlap the training process of the second separation model in the process of training the third separation model will be omitted.

The separation model has an architecture in which an auto encoder, which includes an encoder and a decoder, and a recurrent neural network (RNN) are combined. The separation model may have an architecture of any one of basic en/decoder RNN, end to end en/decoder RNN, and complex number en/decoder RNN. The architecture of the separation model may be selected as any one architecture depending on the characteristics of the audio data to be separated.

Figure 7:
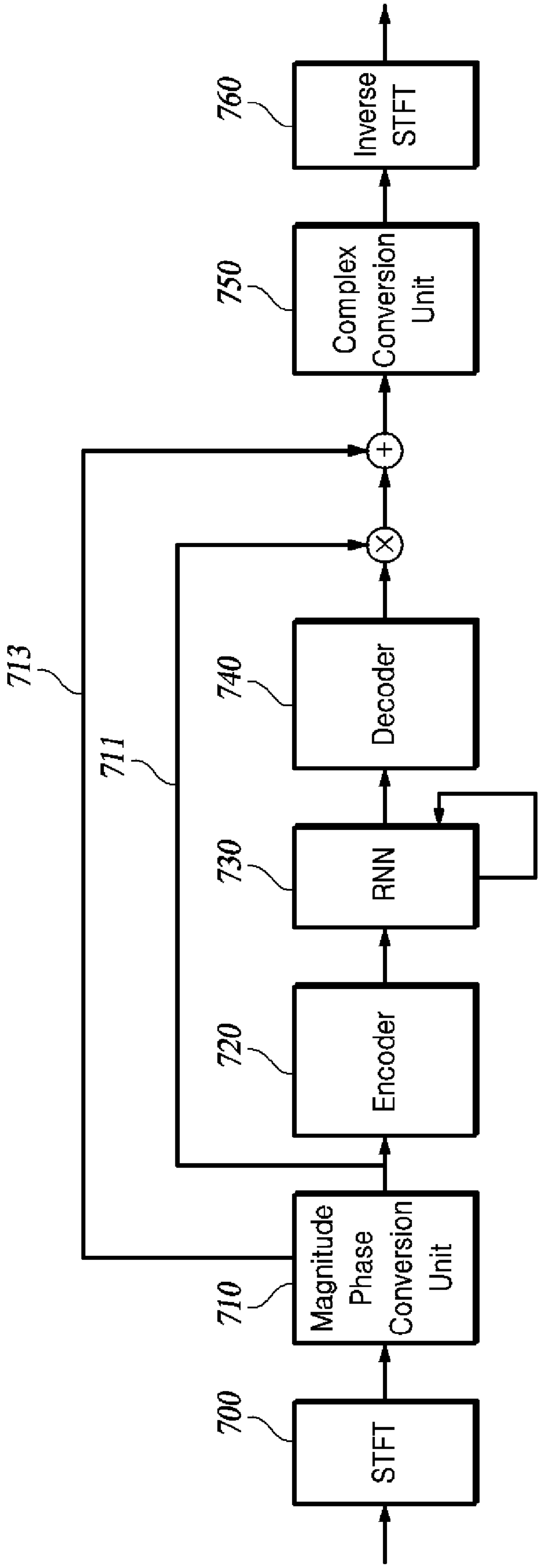
FIG. 7 is a diagram illustrating an architecture of a separation model according to an embodiment of the present disclosure.

FIG. 7 is a diagram illustrating an architecture of a separation model according to an embodiment of the present disclosure.

Referring to FIG. 7, the separation model is composed of the basic encoder/decoder recurrent neural network. The input voice data is converted into the frequency domain using a short-time Fourier transform (STFT) 700.

A magnitude and phase conversion unit 710 converts the frequency domain audio data, transformed into a complex number format by the short-time Fourier transform (STFT) 700, into the magnitude and phase.

When data with too large a dimension is input to a recurrent neural network 730, the amount of calculation increases, so the encoder 720 performs dimension reduction or extracts features on the data related to the magnitude of the audio data. Here, the encoder 720 may include at least one fully connected layer. The encoder 720 may be trained to emphasize a specific frequency band according to the characteristics of the component to be separated by the separation model.

The data about the magnitude output from the encoder 720 is input to the recurrent neural network (RNN, 730). The data that has passed through the recurrent neural network 730 generates a mask using the decoder 740 and is masked with data 711 on the magnitude of the audio data.

Data 713 on the phase of the audio data is added to the masked data and then input to the complex conversion unit 750 to be converted into complex number format. The converted data is converted back into the time domain using the inverse short-time Fourier transform (Inverse STFT) 750 and output as the separated audio data.

The encoder 720 and the decoder 740 may include at least one network among the fully connected layer, the convolution neural network (CNN), and a dilated convolutional neural network (Dilated CNN). The recurrent neural network 730 includes at least one recurrent neural network (RNN). Here, the recurrent neural network 730 may include at least one of a long term short term memory (LSTM) and a gated recurrent unit (GRU).

Figure 8:
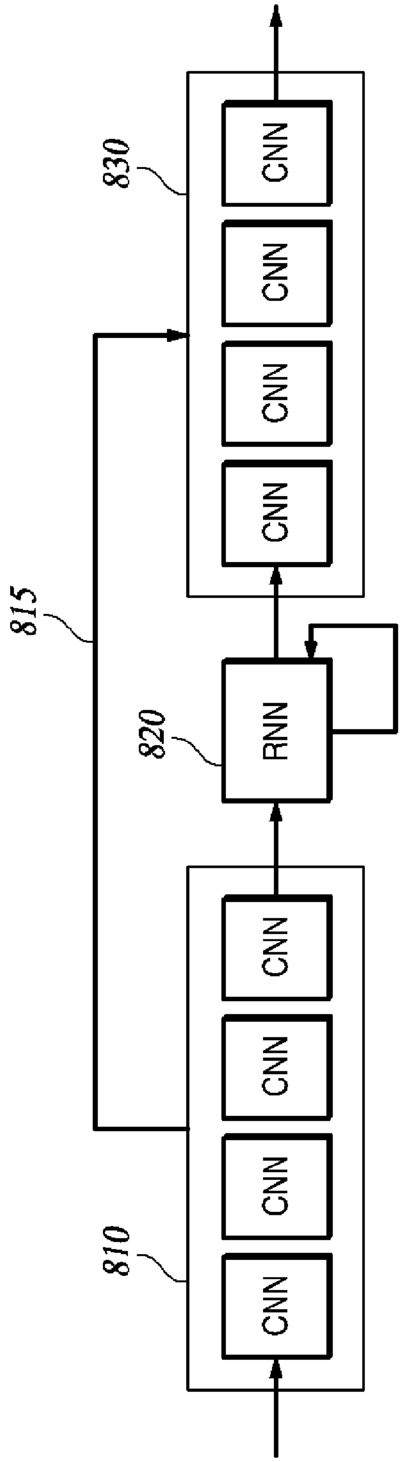
FIG. 8 is a diagram illustrating an architecture of a separation model according to another embodiment of the present disclosure.

FIG. 8 is a diagram illustrating an architecture of a separation model according to another embodiment of the present disclosure.

Referring to FIG. 8, the separation model has an architecture of an end-to-end encoder/decoder recurrent neural network. The input audio data is not converted into the frequency domain using the STFT, but is directly input to an encoder 810. Here, the encoder 810 may include at least one network of the at least one convolutional neural network (CNN) and dilated convolutional neural network (dilated CNN).

When the encoder 810 extracts the features of the input audio data and inputs the extracted features to the recurrent neural network (RNN) 820, the recurrent neural network 820 separates the input features. Here, in order to prevent the data loss and weight update errors when the encoder is configured to the deep and complex network for accurately feature extraction, a skip connection 815 may be included.

The decoder 830 separates audio data based on the separated features and outputs the separated audio data.

Unlike the method of converting the audio data into the frequency domain using the STFT and separating data in consideration of only the features of the magnitude of the audio data, the separation model can have more accurate separation performance by performing the separation based on the overall features of the data.

Figure 9A:
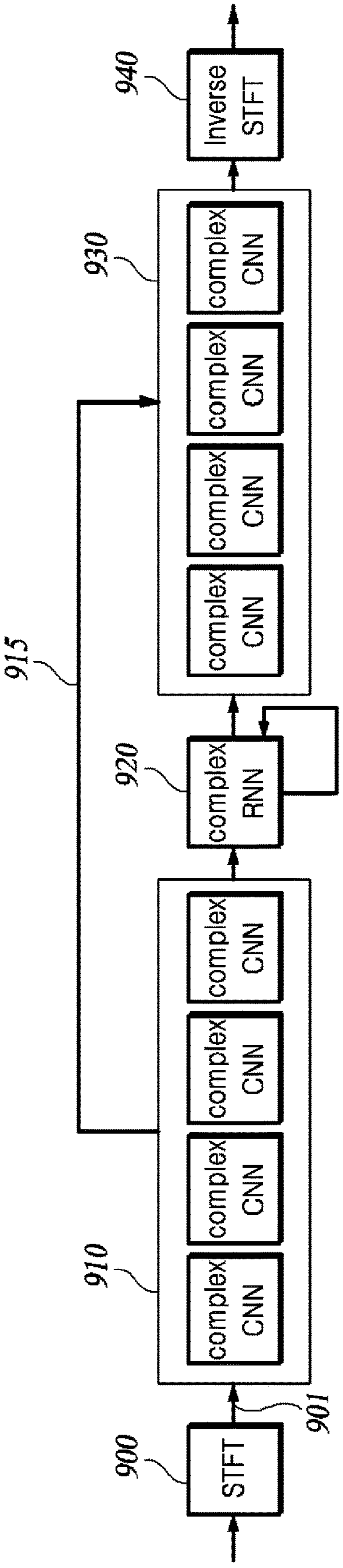
FIGS. 9A and 9B are diagrams illustrating architectures of a separation model according to another embodiment of the present disclosure.
Figure 9B:
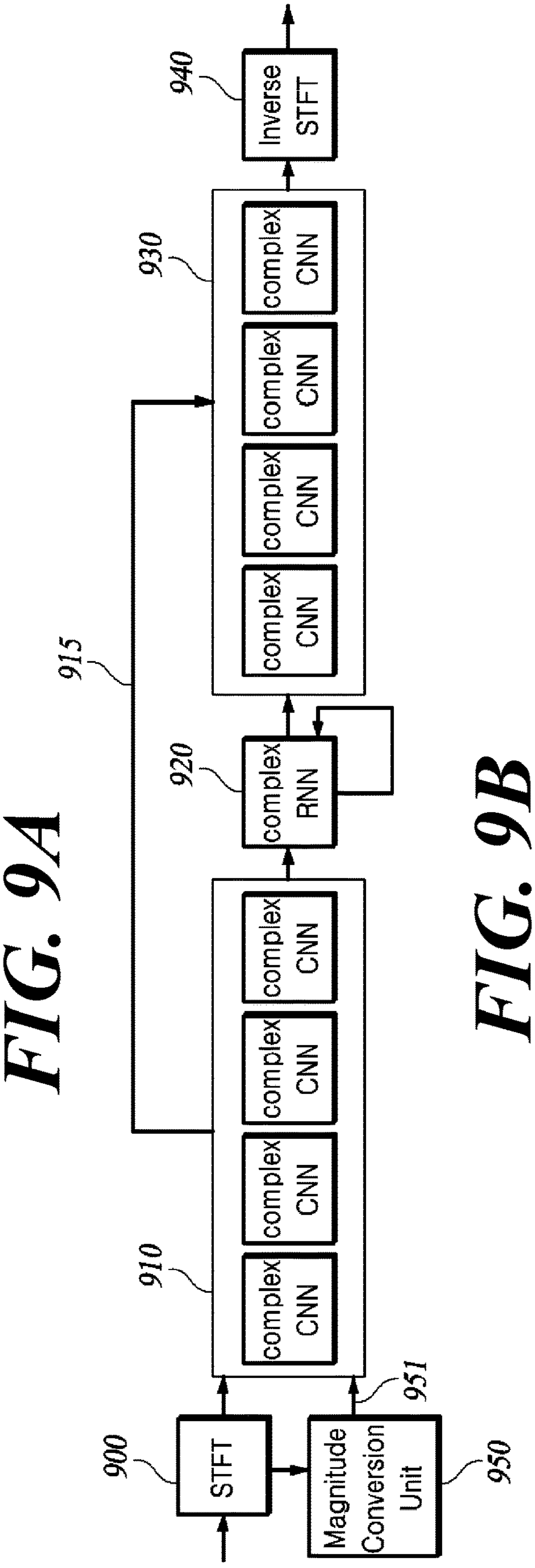

FIGS. 9A and 9B are diagrams illustrating architectures of a separation model according to another embodiment of the present disclosure.

Referring to FIG. 9A, the input audio data is converted into the frequency domain using the STFT 900. The audio data converted into the frequency domain has a complex number format.

Both the imaginary and real parts of the complex number related to the audio data are input to an encoder 910. The encoder 910 extracts features of the input imaginary and real parts using the complex convolutional neural network (complex CNN).

The complex RNN 920 separates the features input from the encoder 910, respectively. The decoder 930 outputs the separated features of the imaginary part and real parts as the separated audio data in the complex number format using the complex convolutional neural network.

The encoder 910 and decoder 930 may include at least one network of the convolutional neural network (CNN) and the dilated convolutional neural network (dilated CNN). Here, the skip connection 915 may be included to prevent the data loss and weight update error.

The data in the complex number format output from the decoder 930 is converted into the separated audio data through an inverse STFT 940 and output.

This separation model uses the complex convolutional neural network and the complex recurrent neural network to simultaneously input the real and imaginary parts of the audio data converted into the frequency domain to the encoder 910.

In order to improve the training results and separation performance of the separation model, the architecture of the separation model illustrated in FIG. 9A may be modified as in FIG. 9B so that data on the magnitude that may best reflect the frequency-specific characteristics of the input audio data are input to the encoder along with the real and imaginary parts.

Referring to FIG. 9B, the input audio data is converted into the complex frequency domain using the STFT. The real and imaginary parts included in the complex data converted into the frequency domain are input to the encoder.

The data in the complex number format converted into the frequency domain is input to a magnitude conversion unit 950. The magnitude conversion unit 950 outputs the magnitude in the frequency domain of the audio data, and inputs the data on the output magnitude to the encoder. Here, the data on the magnitude may be a value calculated based on the values of the real and imaginary parts of the audio data, but is not limited thereto, and may be a separately input value.

Figure 10:
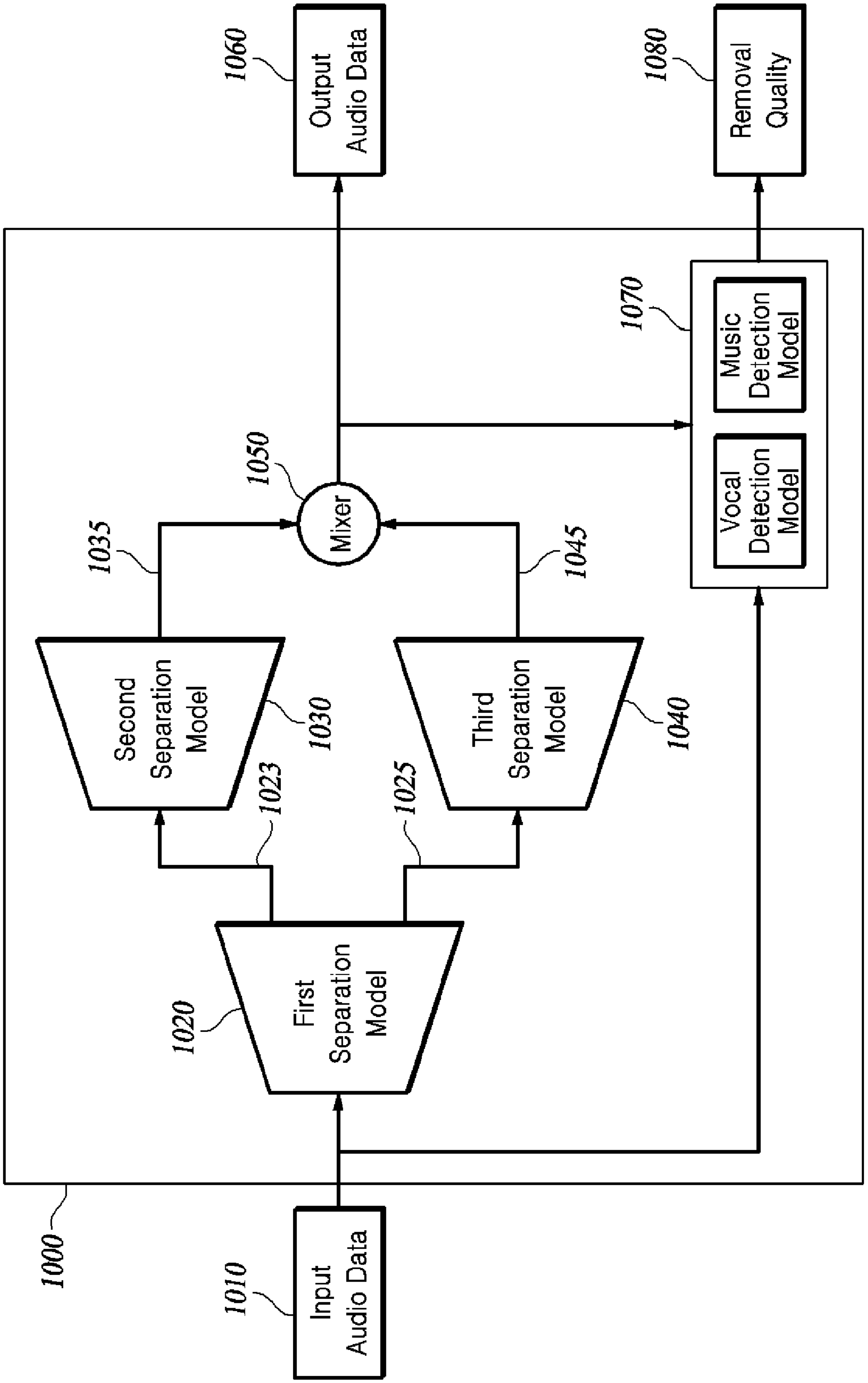
FIG. 10 is a diagram illustrating a process of removing a background sound source by the device for automatically removing a background sound source of a video including a trained separation model according to the embodiment of the present disclosure.

FIG. 10 is a diagram illustrating a process of removing a background sound source by a device for automatically removing a background sound source of a video including a trained separation model according to an embodiment of the present disclosure.

When input audio data 1010, which is audio data of a mastered video, is input to a device 1000 for automatically removing a background sound source of a video, a first separation model 1020 separates into a first component 1023 related to a human voice and a second component 1025 related to sounds other than the human voice. Here, the first component 1023 may include at least one of the speech component and the vocal component, and the second component 1025 may include at least one of the music component and the noise component.

When input audio data 1010, which is audio data of a mastered video, is input to a device 1000 for automatically removing a background sound source of a video, a first separation model 1020 separates the input audio data 1010 into a first component 1023 related to a human voice and a second component 1025 related to sounds other than the human voice. Here, the first component 1023 may include at least one of the speech component and the vocal component, and the second component 1025 may include at least one of the music component and the noise component. When input audio data 1010, which is audio data of a mastered video, is input to a device 1000 for automatically removing a background sound source of a video, a first separation model 1020 separates the input audio data 1010 into a first component 1023 related to a human voice and a second component 1025 related to sounds other than the human voice. Here, the first component 1023 may include at least one of the speech component and the vocal component, and the second component 1025 may include at least one of the music component and the noise component. A mixer 1050 synthesizes the speech component 1035 output from the second separation model 1030 and the noise component 1045 output from the third separation model 1040 to produce output audio data 1060 with the background sound source removed.

A quality measurement unit 1070 compares the input audio data 1010 with the output audio data 1060 with the background sound source removed, and determines the removal quality of the background sound and outputs the determined removal quality. Here, the quality measurement unit 1070 may determine how much the background sound source has been removed using at least one of the vocal detection model and the music detection model.

The device 1000 for automatically removing a background sound source of a video includes all of the trained first separation model 1020, the trained second separation model 1030, and the trained third separation model 1040, but is not limited thereto, and may be used by selecting at least one of the first separation model 1020, the second separation model 1030, and the third separation model 1040 depending on the separation purpose or separation target and may also be configured so that each separate model is connected in series or parallel.

For example, the speech component, the vocal component, the music component, and the noise component have various similarities to each other, and therefore, are difficult to be separated at once. Therefore, by performing a process of first separating whether the sound component is a human voice using the unique characteristics of the human voice among various sound components and separating using characteristics of a component related to the separated human voice to determine whether the component is a singing voice or a speaking voice, it is possible to more accurately separate the speech component and the vocal component.

As in the present embodiment, the first separation model 1020 is utilized to initially separate components related to human voice from other components in the audio data based on a distinguishing feature, for example, a feature related to harmonics or frequency characteristics, and a second separation model 1030 is connected to the first separation model 1020 to subsequently separate the speech component and the vocal component based on features, which may distinguish the speech component and the vocal component from the components related to the separated human voice, for example, features such as a length of a phoneme and a change in pitch, thereby improving the separation performance.

More specifically, according to another embodiment of the present disclosure, the device 1000 for automatically removing a background sound source of a video may be configured to include the trained first separation model and the trained second separation model 1030. The input audio data 1010 is separated into the first component 1023 related to the human voice and the second component 1025 related to sounds other than the human voice using the trained first separation model 1020, and the separated second component 1025 is separated into the speech component and the vocal component using the trained second separation model 1030.

The device 1000 for automatically removing a background sound source of a video may be configured to generate and output the output audio data the background sound source removed based on the separated speech component. Here, the output audio data may be the audio data in which only the speech component is extracted from the audio data of the video, but is not limited thereto. For example, the device 1000 for automatically removing a background sound source of a video may be configured to remove the background sound source, etc., from the audio data of the video in the input drama or movie, extract only voices related to dialogues of characters in the video, and then output the output audio data mixed with new sound effects.

Figure 11:
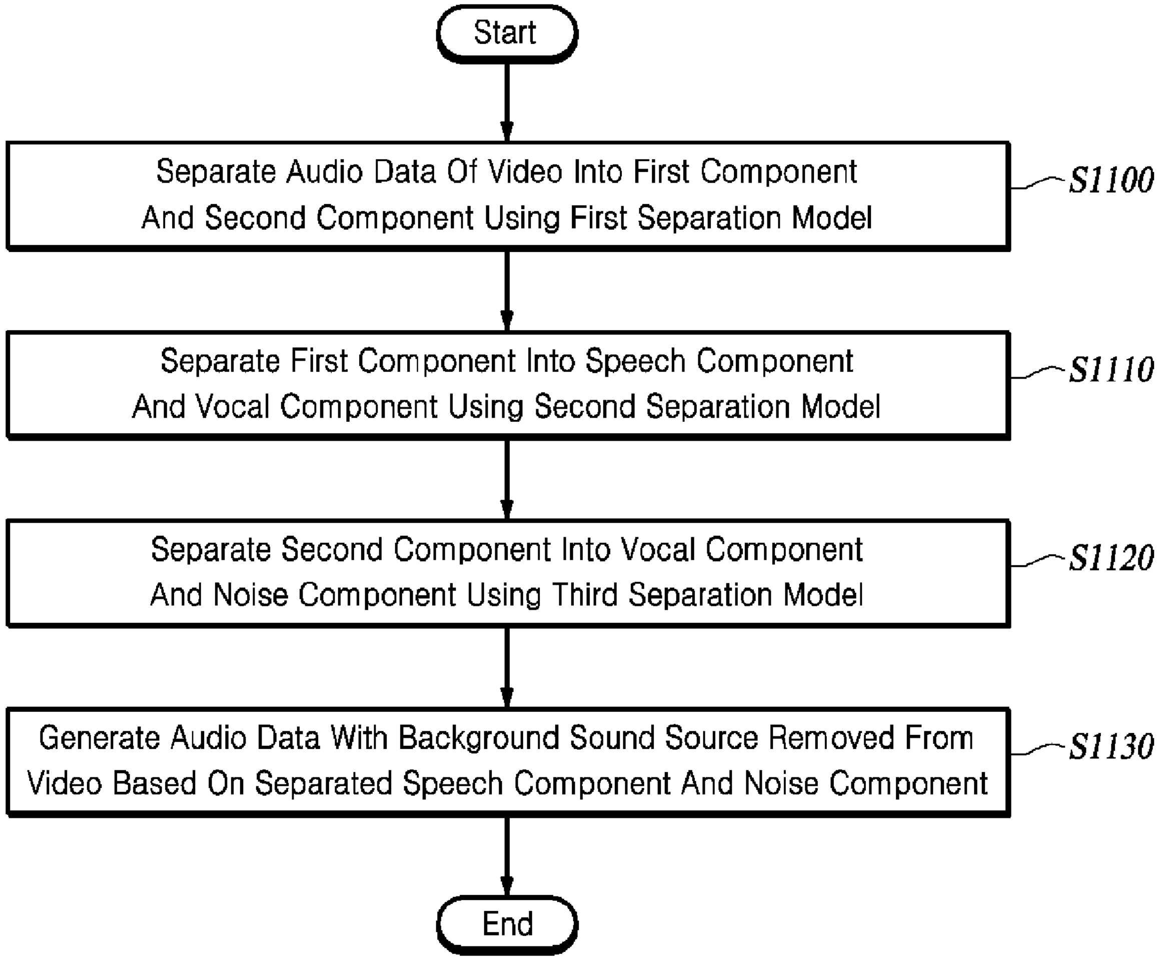
FIG. 11 is a flowchart of a method for automatically removing a background sound source of a video according to an embodiment of the present disclosure.

FIG. 11 is a flowchart of a method for automatically removing a background sound source of a video according to an embodiment of the present disclosure.

The device for automatically removing a background sound source of a video separates the audio data of the video into the first component and the second component using the first separation model (S1100). The first separation model is a separation model pre-trained to separate the voice of the video into the first component related to the human voice and the second component related to sounds other than the human voice.

The first separation model extracts the characteristics of the data related to the voice of the video and separates the extracted characteristics into the first component and the second component. Here, the first separation model may separate the human voice into components corresponding to the human voice and other components using the harmonics or frequency characteristics related to the human voice.

The device for automatically removing a background sound source of a video separates the audio data of the video into the first component and the second component using the first separation model (S1100). The first separation model is a separation model pre-trained to separate the audio data of the video into the first component related to the human voice and the second component related to sounds other than the human voice.

The second separation model is the separation model pre-trained to separate the first component related to the human voice into the speech component and the vocal component. Here, the second separation model may separate the first component corresponding to the human voice into the speech component and the vocal component using features related to a length of a specific phoneme or a change in pitch.

The second separation model may be the separation model trained in the direction of reducing the combined loss using the pre-trained vocal detection model. The second separation model may be the separation model trained through the unsupervised learning using the pre-trained vocal detection model.

The device for automatically removing a background sound source of a video separates the second component into the music component and the noise component using the third separation model (S1120).

The third separation model is the separation model pre-trained to separate the second component related to sounds other than the human voice separated in the first separation model into the music component and the noise component.

The third separation model may be the separation model trained in the direction of decreasing the combined loss using the pre-trained music detection model. The third separation model may be the separation model trained through the unsupervised learning using the pre-trained music detection model.

The device for automatically removing a background sound source of a video generates the audio data having the background sound source removed from the video by synthesizing the separated speech component and noise component (S1130). By separating the vocal component and the music component that constitute the background sound source of the video and generating the audio data based on other components, the audio data excluding the background sound source may be generated from the audio data of the mastered video.

In the flowchart, each process is described as being sequentially executed, but this is merely an illustrative explanation of the technical idea of some embodiments of the present disclosure. Since those skilled in the art to which an embodiment of the present disclosure pertains may change and execute the process described in the flowchart within the range not departing from the essential characteristics of the embodiment of the present disclosure, and one or more of each process may be applied in parallel with various modifications and variations, the flowchart is not limited to a time-series sequence.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a random access memory (RAM), a compact disc ROM (CD-ROM), magnetic tape, a floppy disk, or an optical data storage device. In addition, the computer-readable recording medium may further include a transitory medium such as a data transmission medium. Furthermore, the computer-readable recording medium may be distributed over computer systems connected through a network, and computer-readable program code can be stored and executed in a distributive manner.

Various implementations of the systems and techniques described herein can be realized by a programmable computer. Here, the computer includes a programmable processor, a data storage system (including volatile memory, nonvolatile memory, or any other type of storage system or a combination thereof), and at least one communication interface. For example, the programmable computer may be one of a server, network equipment, a set-top box, an embedded device, a computer expansion module, a personal computer, a laptop, a personal data assistant (PDA), a cloud computing system, or a mobile device.

Although exemplary embodiments of the present disclosure have been described for illustrative purposes, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A method of automatically removing a background sound source of audio data, comprising:

separating, using a first separation model, the audio data including at least one sound source component into a first component related to a human voice and a second component related to sounds other than the human voice;

separating, using a second separation model, the first component into a vocal component included in the background sound source and a speech component excluded from the background sound source;

separating, using a third separation model, the second component into a music component included in the background sound source and a noise component excluded from the background sound source; and generating, by synthesizing the speech component and the noise component, new audio data with the background sound source for the audio data removed.

2. The method of claim 1, wherein the first separation model is trained using a training method including:

generating first training data based on a first component including at least one of a speech component and a vocal component for a first dataset and a second component including at least one of a music component and a noise component for the first dataset;

separating the first training data into the first component for the first training data and the second component for the first training data using the first separation model;

calculating a first separation loss based on the first component for the first training data, the second component for the first training data, and a corresponding ground truth; and updating at least one weight of the first separation model based on the first separation loss.

3. The method of claim 2, wherein the second separation model is trained using a training method including:

generating second training data based on a speech component and a vocal component for a second dataset;

separating the second training data into a speech component for the second training data and a vocal component for the second training data using the second separation model;

calculating quality data for the second training data using a pre-trained vocal detection model;

calculating a second detection loss related to a speech component for the second training data and a vocal component for the second training data using the vocal detection model;

calculating a second separation loss based on the speech component for the second training data and the vocal component for the second training data, which are separated by the second separation model, and a corresponding ground truth;

calculating a second combined loss based on the quality data for the second training data, the second detection loss, and the second separation loss; and updating at least one weight of the second separation model based on the second combined loss.

4. The method of claim 1, wherein the third separation model is trained using a training method including:

generating third training data based on a music component and a noise component for a third dataset;

separating the third training data into a music component for the third training data and a noise component for the third training data using the third separation model;

calculating quality data for the third training data using a pre-trained music detection model;

calculating a third detection loss related to a music component for the third training data and a noise component for the third training data using the music detection model;

calculating a third separation loss based on a music component for the third training data separated by the third separation model, a noise component for the third training data, and a corresponding ground truth;

calculating a third combined loss based on the quality data for the third training data, the third detection loss, and the third separation loss; and updating at least one weight of the third separation model based on the third combined loss.

5. The method of claim 1, wherein the second separation model is trained using a training method including:

separating a training data into a speech component for training data and a vocal component for the training data using the second separation model;

calculating a probability that the speech component for the training data is a vocal component using a pre-trained vocal detection model;

calculating a probability that the vocal component for the training data is a vocal component using the vocal detection model;

generating a first vocal detection loss based on the probability that the speech component for the training data is a vocal component;

generating a second vocal detection loss based on the probability that the vocal component for the training data is a vocal component; and updating at least one weight of the second separation model based on the first vocal detection loss and the second vocal detection loss.

6. The method of claim 1, wherein the third separation model is trained using a training method including:

separating a training data into a music component for the training data and a noise component for the training data using the third separation model;

calculating a probability that the music component for the training data is the music component using a trained music detection model;

calculating a probability that the noise component for the training data is the music component using the music detection model;

generating a first music detection loss based on the probability that the music component for the training data is the music component;

generating a second music detection loss based on the probability that the noise component for the training data is the music component; and updating at least one weight of the third separation model based on the first music detection loss and the second music detection loss.

7. A device for removing a background sound source, comprising:

a memory configured to store one or more instructions; and a processor configured to execute the one or more instructions stored in the memory, wherein the processor executes the one or more instructions to separate, using a first separation model, an audio data including at least one sound source component into a first component related to a human voice and a second component related to sounds other than a human voice, separate, using a second separation model, the first component into a vocal component included in the background sound source and a speech component excluded from the background sound source, separate, using a third separation model, the second component into a music component included in the background sound source and a noise component excluded from the background sound source, and generate, by synthesizing the speech component and the noise component, new audio data with the background sound source for the audio data removed.

8. The device of claim 7, wherein the first separation model is trained by:

generating first training data based on a first component including at least one of a speech component and a vocal component for a first dataset and a second component including at least one of a music component and a noise component for the first dataset;

separating the first training data into the first component for the first training data and the second component for the first training data using the first separation model;

calculating a first separation loss based on the first component for the first training data, the second component for the first training data, and a corresponding ground truth; and updating at least one weight of the first separation model based on the first separation loss.

9. The device of claim 8, wherein the second separation model is trained by:

generating second training data based on a speech component and a vocal component for a second dataset;

separating the second training data into a speech component for the second training data and a vocal component for the second training data using the second separation model;

calculating quality data for the second training data using a pre-trained vocal detection model;

calculating a second detection loss related to a speech component for the second training data and a vocal component for the second training data using the vocal detection model;

calculating a second separation loss based on the speech component for the second training data and the vocal component for the second training data, which are separated by the second separation model, and a corresponding ground truth;

calculating a second combined loss based on the quality data for the second training data, the second detection loss, and the second separation loss; and updating at least one weight of the second separation model based on the second combined loss.

10. The device of claim 9, wherein the quality data includes a probability value that represents a quality of the second training data and is used as a weight applied to a sum of a detection loss and a separation loss for the second training data.

11. The method of claim 3, wherein the quality data includes a probability value that represents a quality of the second training data and is used as a weight applied to a sum of a detection loss and a separation loss for the second training data.

* * * * *